US012183966B2

(12) United States Patent
Kasani et al.

(10) Patent No.: US 12,183,966 B2
(45) Date of Patent: Dec. 31, 2024

(54) BASE STATION ANTENNAS HAVING MULTI-COLUMN SUB-ARRAYS OF RADIATING ELEMENTS

(71) Applicant: Outdoor Wireless Networks LLC, Claremont, NC (US)

(72) Inventors: Kumara Swamy Kasani, Godavarikhani (IN); Ligang Wu, Suzhou (CN); Faisalbin Abdulmajeed N, Angadippuram (IN); Kamalakar Yeddula, Nandyala (IN)

(73) Assignee: OUTDOOR WIRELESS NETWORKS LLC, Claremont, NC (US)

( * ) Notice: Subject to any disclaimer, the term of this patent is extended or adjusted under 35 U.S.C. 154(b) by 120 days.

(21) Appl. No.: 18/162,757

(22) Filed: Feb. 1, 2023

(65) Prior Publication Data

US 2023/0299469 A1 Sep. 21, 2023

(30) Foreign Application Priority Data

Mar. 17, 2022 (IN) ............................ 202241014927

(51) Int. Cl.

| | |
|---|---|
| ***H01Q 1/52*** | (2006.01) |
| ***H01Q 1/24*** | (2006.01) |
| ***H01Q 19/10*** | (2006.01) |
| ***H01Q 21/24*** | (2006.01) |

(52) U.S. Cl.

CPC ............. *H01Q 1/246* (2013.01); *H01Q 1/523* (2013.01); *H01Q 19/10* (2013.01); *H01Q 21/24* (2013.01)

(58) Field of Classification Search

CPC .......... H01Q 1/246; H01Q 1/523; H01Q 5/48; H01Q 19/10; H01Q 21/0025; H01Q 21/24

See application file for complete search history.

(56) References Cited

U.S. PATENT DOCUMENTS

| | | | |
|---|---|---|---|
| 9,831,548 B2 | 11/2017 | Timofeev et al. | |
| 11,056,773 B2 | 7/2021 | Kasani et al. | |
| 11,069,960 B2 | 7/2021 | Raj et al. | |
| 2018/0358693 A1 | 12/2018 | Yoshihara et al. | |
| 2022/0069462 A1 | 3/2022 | Hojjat | |
| 2022/0069874 A1* | 3/2022 | Wu ...................... | H04B 7/0617 |

FOREIGN PATENT DOCUMENTS

| | | | |
|---|---|---|---|
| WO | WO-2022061937 A1 * | 3/2022 | ........... H01Q 1/2283 |

OTHER PUBLICATIONS

Notification of Transmittal of the International Search Report and the Written Opinion of the International Searching Authority, or the Declaration, in corresponding PCT Application No. PCT/US2022/081735 (Mar. 24, 2023).

* cited by examiner

*Primary Examiner* — Hoang V Nguyen
(74) *Attorney, Agent, or Firm* — Myers Bigel, P.A.

(57) ABSTRACT

Base station antennas are provided. A base station antenna includes a first array of radiating elements and a second array of radiating elements that is interleaved with the first array. Each of the first and second arrays has a plurality of non-rectangular sub-arrays that include radiating elements in one or more outer columns and radiating elements in an inner column that is between the first and second outer columns.

19 Claims, 8 Drawing Sheets

BASE STATION ANTENNAS HAVING MULTI-COLUMN SUB-ARRAYS OF RADIATING ELEMENTS

CROSS-REFERENCE TO RELATED APPLICATION

The present application claims priority to Indian Provisional Patent Application No. 202241014927, filed Mar. 17, 2022, the entire content of which is incorporated herein by reference.

BACKGROUND

The present invention generally relates to radio communications and, more particularly, to base station antennas for cellular communications systems.

Cellular communications systems are well known in the art. In a cellular communications system, a geographic area is divided into a series of regions or "cells" that are served by respective base stations. Each base station may include one or more base station antennas that are configured to provide two-way radio frequency ("RF") communications with subscribers that are within the cell served by the base station. In many cases, each base station is divided into "sectors." In one common configuration, a hexagonally-shaped cell is divided into three 120° sectors in the azimuth plane, and each sector is served by one or more base station antennas that generate radiation patterns of "antenna beams" having azimuth Half Power Beamwidths ("HPBWs") of approximately 65°. Typically, the base station antennas are mounted on a tower or other raised structure, with the antenna beams that are generated by the base station antennas directed outwardly. Base station antennas are often implemented as linear arrays or planar phased arrays of radiating elements.

To increase capacity, base station antennas that include beamforming arrays and/or arrays that are configured to operate with massive multi-input-multi-output ("MIMO") radios have been introduced in recent years. A beamforming array refers to an antenna array that includes multiple columns of radiating elements. RF signals that are to be transmitted by the beamforming array are broken into sub-components that are transmitted through respective groups, or "sub-arrays," of one or more radiating elements. The amplitudes and phases of the sub-components are adjusted by the radio so that the beamforming array generates antenna beams having reduced (narrower) beamwidths in, for example, the horizontal or "azimuth" plane, which increases the directivity or "gain" of the antenna, thereby increasing the supportable throughput. MIMO refers to a communication technique in which a data stream is broken into pieces that are simultaneously transmitted using certain coding techniques over multiple relatively uncorrelated transmission paths between a transmitting station and a receiving station. Multi-column antenna arrays may be used for MIMO transmissions, where each column in the array may be connected to a port of a MIMO radio and used to transmit/receive one of the multiple data streams. In practice, as orthogonal polarizations tend to be highly uncorrelated, the radiating elements in a MIMO array are typically implemented as dual-polarized radiating elements, allowing each column in the MIMO array to be connected to two ports on the radio (where the first port is connected to the first-polarization radiators of the radiating elements in the column, and the second port is connected to the second-polarization radiators of the radiating elements in the column). This technique can effectively halve the number of columns of radiating elements required, as each physical column of the array contains two independent columns of radiators.

SUMMARY

Pursuant to embodiments of the present invention, a base station antenna may include a first antenna array having a vertical stack of first sub-arrays that each have a plurality of first-band radiating elements. The base station antenna may include a second antenna array having a vertical stack of second sub-arrays that each have a plurality of first-band radiating elements. The first sub-arrays may share a vertical column of first-band radiating elements with the second sub-arrays. Moreover, the first-band radiating elements that are in the shared vertical column may be configured to have a fixed phase delay applied thereto that is different from fixed phase delays of the first-band radiating elements of portions of the first and second sub-arrays that are outside of the shared vertical column.

In some embodiments, the first and second sub-arrays may each be L-shaped sub-arrays. Moreover, the base station antenna may include a reflector having the first and second antenna arrays thereon. A width of the reflector may be narrower than 700 millimeters, and the first-band radiating elements may be configured to operate in all or part of a 617-960 megahertz frequency band.

According to some embodiments, the base station antenna may include a plurality of first power dividers that are coupled to the first sub-arrays, respectively. Moreover, the base station antenna may include a plurality of second power dividers that are coupled to the second sub-arrays, respectively.

In some embodiments, each of the first and second power dividers may include a three-way power divider. Moreover, the base station antenna may include a plurality of phase shifters. A first of the first power dividers may be coupled between a first of the phase shifters and a first of the first sub-arrays. A first of the second power dividers may be coupled between a second of the phase shifters and a first of the second sub-arrays.

According to some embodiments, the first and second sub-arrays may each include three first-band radiating elements that are configured to have three different fixed phase delays, respectively, applied thereto. Moreover, a single one of the three first-band radiating elements may be in the shared vertical column.

In some embodiments, the base station antenna may include a plurality of second-band radiating elements. Some, but not all, of the first sub-arrays may overlap the second-band radiating elements in a forward direction. Some, but not all, of the second sub-arrays may overlap the second-band radiating elements in the forward direction. The second band may be higher than the first band. Moreover, the shared vertical column may not overlap any of the second-band radiating elements in the forward direction.

A base station antenna, according to some embodiments, may include a first outer column of radiating elements of a first array. The first array may include a plurality of first non-rectangular sub-arrays. The base station antenna may include a second outer column of radiating elements of a second array. The second array may include a plurality of second non-rectangular sub-arrays. The base station antenna may include an inner column of radiating elements that is shared by the first and second arrays and is between the first and second outer columns. Moreover, the base station antenna may include a plurality of power dividers. The power dividers may include first power dividers that are coupled to the first non-rectangular sub-arrays, respectively, and second power dividers that are coupled to the second non-rectangular sub-arrays, respectively. A first of the first non-rectangular sub-arrays may include first through third radiating elements. The first and second radiating elements may be in the first outer column and may be coupled by first and second RF transmission lines, respectively, to a first of the first power dividers. The first and second RF transmission lines may have different first and second lengths, respectively. The third radiating element may be in the inner column and may be coupled to the first of the first power dividers by a third RF transmission line having a third length that is longer than each of the first and second lengths.

In some embodiments, a first of the second non-rectangular sub-arrays may include fourth through six radiating elements. The fourth and fifth radiating elements may be in the second outer column and may be coupled by fourth and fifth RF transmission lines, respectively, to a first of the second power dividers. The fourth and fifth RF transmission lines may have different fourth and fifth lengths, respectively. The sixth radiating element may be in the inner column and may be coupled to the first of the second power dividers by a sixth RF transmission line having a sixth length that is longer than each of the fourth and fifth lengths.

According to some embodiments, the first, third, and fourth radiating elements may be in a first row. The second, sixth, and fifth radiating elements may be in a second row. Moreover, the base station antenna may include a reflector having the first and second arrays thereon, a plurality of first metal isolation walls protruding forward from a first edge of the reflector, and a plurality of second metal isolation walls protruding forward from a second edge of the reflector that is opposite the first edge. The first row may be between a first of the first metal isolation walls and a first of the second metal isolation walls. The second row may be between a second of the first metal isolation walls and a second of the second metal isolation walls.

In some embodiments, the base station antenna may include a metal isolation wall that is between the third radiating element and the sixth radiating element. Moreover, the first through sixth RF transmission lines may include first through sixth cables, respectively. The base station antenna may include a plurality of RF ports and a plurality of phase shifters that are coupled to the RF ports, respectively. A first of the phase shifters may be coupled between a first of the RF ports and the first of the first power dividers. A second of the phase shifters may be coupled between a second of the RF ports and the first of the second power dividers.

A base station antenna, according to some embodiments, may include a first antenna array having a vertical stack of first sub-arrays that each have a plurality of first-band radiating elements. The base station antenna may include a second antenna array having a vertical stack of second sub-arrays that each have a plurality of first-band radiating elements. The first sub-arrays may share a plurality of vertical columns of first-band radiating elements with the second sub-arrays. In some embodiments, the first and second sub-arrays may each be triangle-shaped sub-arrays.

According to some embodiments, the first and second sub-arrays each have three first-band radiating elements. The three first-band radiating elements may be in three of the vertical columns, respectively. Moreover, in each of the three of the vertical columns, the first-band radiating elements of the first antenna array may repeatedly alternate with the first-band radiating elements of the second antenna array. The base station antenna may include a plurality of RF ports. Each of the first and second antenna arrays may be coupled to a respective one of the RF ports per polarization.

DETAILED DESCRIPTION

Pursuant to embodiments of the present invention, base station antennas are provided that have a narrower width, lower cost, and lighter weight than conventional base station antennas that include four columns of low-band radiating elements (i.e., radiating elements that operate in all or part of the 617-960 megahertz ("MHz") frequency band). Base station antennas that include three columns of low-band radiating elements may, in some embodiments, use 25% fewer low-band dipole radiating elements, and may thereby reduce antenna width from about 900 millimeters ("mm") to about 640 mm. As an example, such a "three-column" base station antenna according to some embodiments may have two arrays that include two outer columns, respectively, of low-band radiating elements and that share an inner column of low-band radiating elements. Though the shared inner column may increase the risk of reduced isolation and/or grating lobe problems, some embodiments can reduce/solve such problems by applying different amounts of fixed phase delay to respective low-band radiating elements that are in a sub-array. In another example, sub-arrays of the two arrays may each have radiating elements in all three columns, and may thereby provide a narrower beamwidth.

Embodiments of the present invention will now be discussed in greater detail with reference to the attached figures.

Figure 1A:
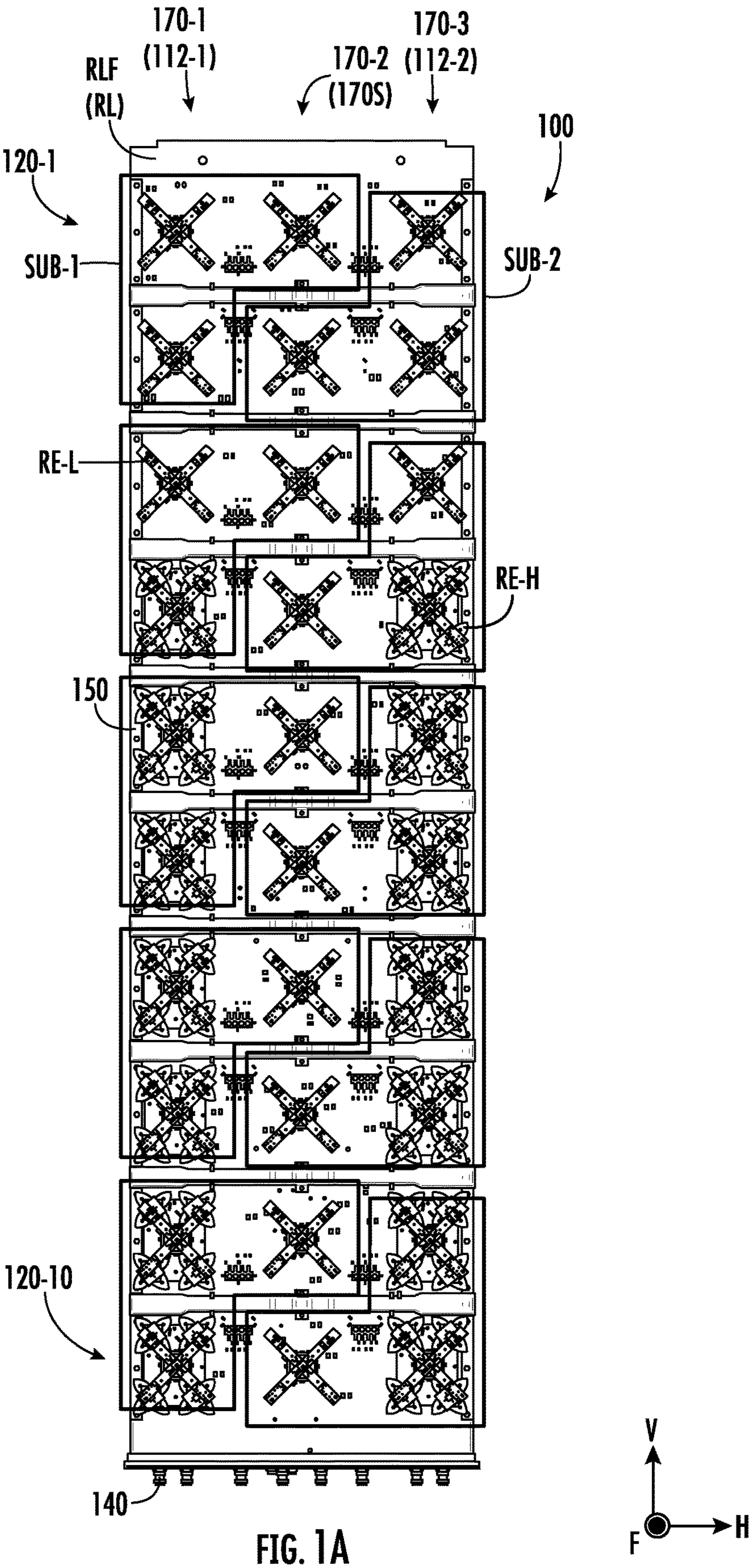
FIG. 1A is a front view of a base station antenna that includes L-shaped sub-arrays of radiating elements according to embodiments of the present invention.

FIG. 1A is a front view of a base station antenna 100 that includes first and second arrays 112-1, 112-2 having a plurality of first non-rectangular sub-arrays SUB-1 and a plurality second non-rectangular sub-arrays SUB-2, respectively, of radiating elements RE according to embodiments of the present invention. The radiating elements RE may be inside a radome of the antenna 100. For simplicity of illustration, the radome is omitted from view in FIG. 1A.

As shown in FIG. 1A, each non-rectangular sub-array SUB may be a multi-column 170, L-shaped sub-array. For example, each sub-array SUB-1 may include three low-band radiating elements RE-L, two of which are in a first outer vertical column 170-1 and a third of which is in an inner vertical column 170-2. Similarly, each sub-array SUB-2 may include three low-band radiating elements RE-L, two of which are in a second outer vertical column 170-3 and a third of which is in the inner column 170-2.

Moreover, the sub-arrays SUB-1 may be arranged in a pattern along a vertical direction V. and thus may collectively be referred to as a first "vertical stack." The sub-arrays SUB-2 may be arranged in a similar/complementary pattern along the direction V, and thus may collectively be referred to as a second vertical stack. The second vertical stack of the sub-arrays SUB-2 is side-by-side, and interlaced/interleaved (due to the inner column 170-2), with the first vertical stack of the sub-arrays SUB-1.

The inner column 170-2 is between, in a horizontal direction H, the two outer columns 170-1, 170-3. Each of the sub-arrays SUB-1. SUB-2 includes a single radiating element RE-L that is in the inner column 170-2. The inner column 170-2 may thus be referred to herein as a "shared" column 170S, as it includes radiating elements RE-L from both the first array 112-1 and the second array 112-2. In the inner column 170-2, radiating elements RE-L of the first array 112-1 repeatedly alternate, along the direction V, with radiating elements RE-L of the second array 112-2.

The antenna 100 may also include high-band (or mid-band) radiating elements RE-H. The high band (or mid band) may, in some embodiments, include frequencies that are at least twice as high as those of the low band. As noted above, the low band may comprise frequencies between 617 MHz and 960 MHz or a portion thereof, and the high band (or mid band) may comprise frequencies between 1427 MHz and 2690 MHz or a portion thereof. In some embodiments, the sub-arrays SUB-1 may operate in a first portion of the low band, and the sub-arrays SUB-2 may operate in a second portion of the low band that is different from (e.g., non-overlapping with) the first portion.

As shown in FIG. 1A, some (but not all) of the sub-arrays SUB-1 (e.g., dipole arms thereof) may overlap radiating elements RE-H in a forward direction F. Also, some (but not all) of the sub-arrays SUB-2 may overlap radiating elements RE-H in the direction F. For example, some of the radiating elements RE-L in the outer columns 170-1, 170-3 may be centered between respective groups of four radiating elements RE-H.

Radiating elements RE-L that are in the shared column 170S, on the other hand, are not centered between a group of four radiating elements RE-H. Accordingly, the shared vertical column 170S may not overlap any of the radiating elements RE-H in the direction F. The direction F may be perpendicular to the directions H, V, which may also be perpendicular to each other.

Moreover, groups of three radiating elements RE-L may be in respective horizontal rows 120, and ones of the rows 120 that are closest to the top of the antenna 100 may include only radiating elements RE-L that are not centered between (and do not overlap in the direction F) a group of four radiating elements RE-H. For example, the antenna 100 may include ten rows 120-1 through 120-10, and center points of radiating elements RE-L that are in the same row 120 may be collinear in the direction H. Each row 120 includes at least one radiating element RE-L from each array 112-1, 112-2.

The radiating elements RE-L in the arrays 112-1, 112-2 are mounted to extend forwardly (i.e., in the direction F) from a reflector RL. In some embodiments, a plurality of metal side fences 150 may protrude, in the direction F, from a front surface RLF of the reflector RL. Each side fence 150 may provide an RF isolation wall for the antenna 100. Moreover, each row 120 may be between, in the direction H, a pair of the side fences 150. As a result, the side fences 150 may improve front-to-back isolation and cross-polarization isolation of the antenna 100. For example, side fences 150 that protrude forward in the direction F to a height of about 30 mm may provide front-to-back isolation that is better than about −20 decibels ("dB"). Also, a gap of about 42 mm in the direction V between adjacent side fences 150 may provide sufficient space for radome supports.

The antenna 100 further comprises RF ports 140, which may also be referred to herein as "connectors" or "antenna signal ports," that are coupled (e.g., electrically connected) to the radiating elements RE-L, RE-H. For example, the radiating elements RE-L may be dual-polarized radiating elements so that the arrays 112-1, 112-2 may generate antenna beams at each of two polarizations (e.g., −45° and +45° slant polarizations), and each of the arrays 112-1, 112-2 may be coupled to a single RF port 140 per polarization. Others of the RF ports 140 may be coupled to the radiating elements RE-H (e.g., to respective vertical columns thereof).

The antenna signal ports 140 may also be coupled to respective radio signal ports of a radio. For example, the radio may be a MIMO beamforming radio for a cellular base station, and the antenna 100 and the radio may be located at (e.g., may be components of) a cellular base station. For simplicity of illustration, the radio and the RF connections between the radio and the antenna signal ports 140 are omitted from view in FIG. 1A. The radio may be integrated into or mounted on the antenna 100 in some embodiments, or mounted on an antenna tower adjacent the antenna.

Moreover, though the example antenna 100 has two arrays 112 of fifteen radiating elements RE-L each, antennas according to the present invention may, in some embodiments, include more or fewer radiating elements RE-L (e.g., more or fewer sub-arrays SUB) in each array 112. The number of radiating elements RE-L per array 112 may, for example, be selected so that antenna beams generated by the arrays 112 may have suitable beamwidths in the elevation (vertical) plane.

Figure 1B:
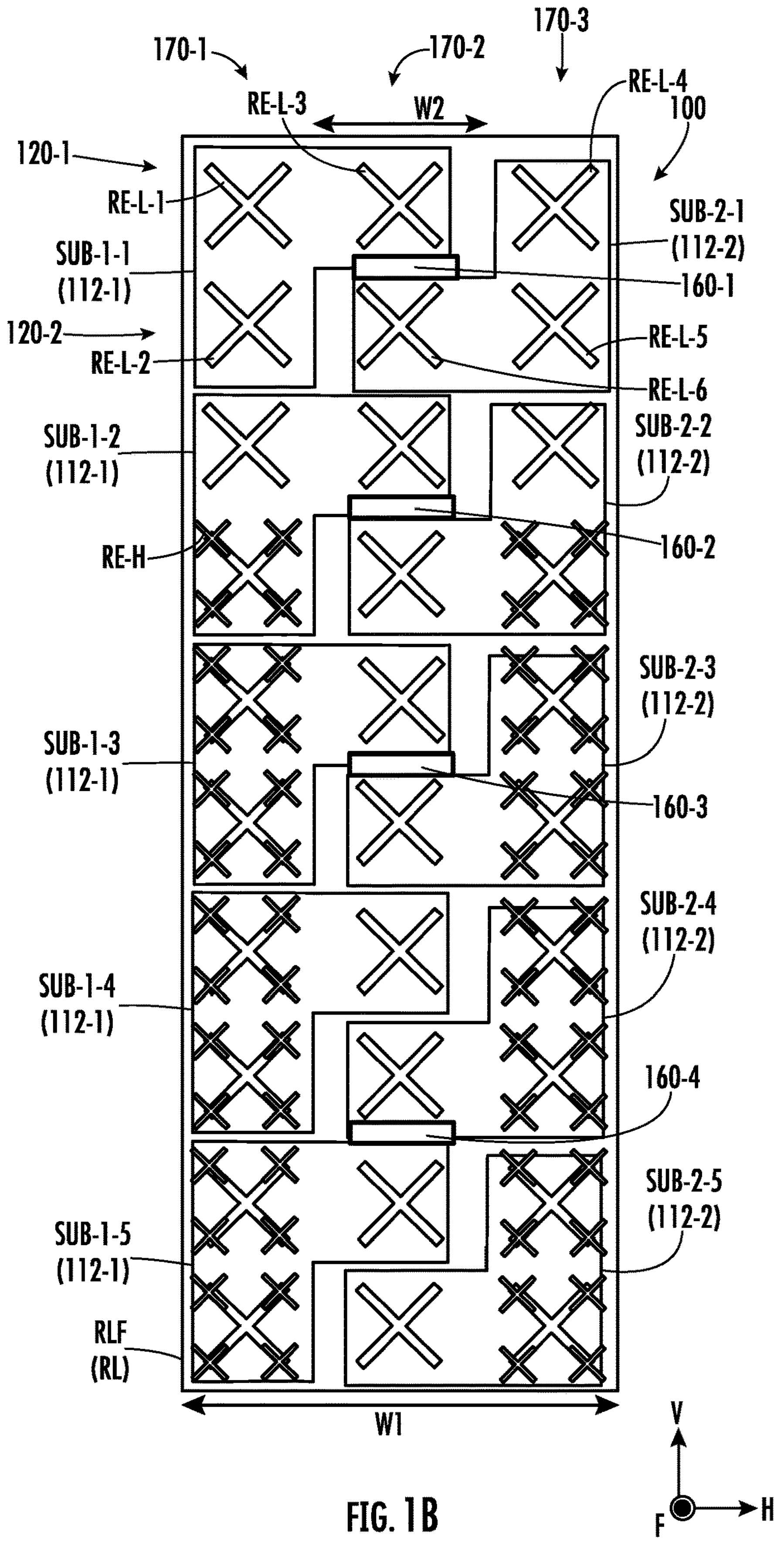
FIG. 1B is a schematic front view of the antenna of FIG. 1A.

FIG. 1B is a schematic front view of the antenna 100 of FIG. 1A. As shown in FIG. 1B, the first sub-arrays SUB-1 may include five sub-arrays SUB-1-1 through SUB-1-5 of the first array 112-1. The second sub-arrays SUB-2 may, likewise, include five sub-arrays SUB-2-1 through SUB-2-5 of the second array 112-2. Each array 112 may include a respective outer column 170-1 or 170-3 of low-band radiating elements RE-L and half of the inner column 170-2 of radiating elements RE-L.

In some embodiments, each sub-array SUB may include three radiating elements RE-L. For example, FIG. 1B shows that a first (e.g., uppermost) sub-array SUB-1-1 of the first array 112-1 may include three radiating elements RE-L-1 through RE-L-3. The first and second radiating elements RE-L-1, RE-L-2 are in the outer column 170-1, and the third radiating element RE-L-3 is in the inner column 170-2. Similarly, a first (e.g., uppermost) sub-array SUB-2-1 of the second array 112-2 may include three radiating elements RE-L-4 through RE-L-6, where the fourth and fifth radiating elements RE-L-4, RE-L-5 are in the outer column 170-3, and the sixth radiating element RE-L-6 is in the inner column 170-2. Accordingly, the third radiating element RE-L-3 of the sub-array SUB-1-1 shares the inner column 170-2 with the sixth radiating element RE-L-6 of the sub-array SUB-2-1. Moreover, the first, third, and fourth radiating elements RE-L-1, RE-L-3, RE-L4, may be in a first row 120-1, and the second, fifth, and sixth radiating elements RE-L-2, RE-L-5, RE-L-6, may be in a second row 120-2.

As is further shown in FIG. 1B, a plurality of metal fences 160 may be positioned between adjacent radiating elements RE-L that are in the inner column 170-2. For example, a first metal fence 160-1 may be between the third radiating element RE-L-3 that is in the sub-array SUB-1-1 and the sixth radiating element RE-L-6 that is in the sub-array SUB-2-1, which is adjacent the sub-array SUB-1-1. Moreover, a second metal fence 160-2 may be between respective radiating elements RE-L that are in adjacent sub-arrays SUB-1-2, SUB-2-2, a third metal fence 160-3 may be between respective radiating elements RE-L that are in adjacent sub-arrays SUB-1-3, SUB-2-3, and a fourth metal fence 160-4 may be between respective radiating elements RE-L that are in adjacent sub-arrays SUB-24, SUB-1-5. The fences 160 are discussed in further detail herein with respect to FIG. 1G and may be referred to herein as "horizontal metal fences" (or "horizontal fences") because they may extend longitudinally in the direction H. Each horizontal fence 160 may provide an RF isolation wall for the antenna 100. According to some embodiments, more or fewer horizontal fences 160 than the four that are shown in FIG. 1B may be provided between low-band radiating elements RE-L in the inner column 170-2.

In some embodiments, the horizontal fences 160 and the side fences 150 (FIG. 1A) may both be on the front surface RLF of the reflector RL. For simplicity of illustration, however, the horizontal fences 160 are omitted from view in FIG. 1A and the side fences 150 are omitted from view in FIG. 1B. In other embodiments, the horizontal fences 160 may be present on the front surface RLF while the side fences 150 are omitted, or vice versa, or the horizontal fences 160 and the side fences 150 may both be omitted.

FIG. 1B also shows that the reflector RL has a width W1 in the direction H. In contrast with a conventional "four-column" antenna that includes four columns of low-band radiating elements, which may have a width of at least 900 mm, the width W1 is narrower than 900 mm. As an example, the width W1 may be narrower than 700 mm. In some embodiments, the width W1 may be about 640 mm.

Moreover, a width W2 of a middle portion of the reflector RL may be equal to a pitch (e.g., a center-to-center distance) between adjacent inner columns of a conventional, non-interleaved four-column antenna. For example, the width W2 may be 230 mm. To narrow a beamwidth of the antenna 100 (e.g., to 45°), adjacent columns 170 may, in some embodiments, have a slightly larger pitch than 230 mm.

Figure 1C:
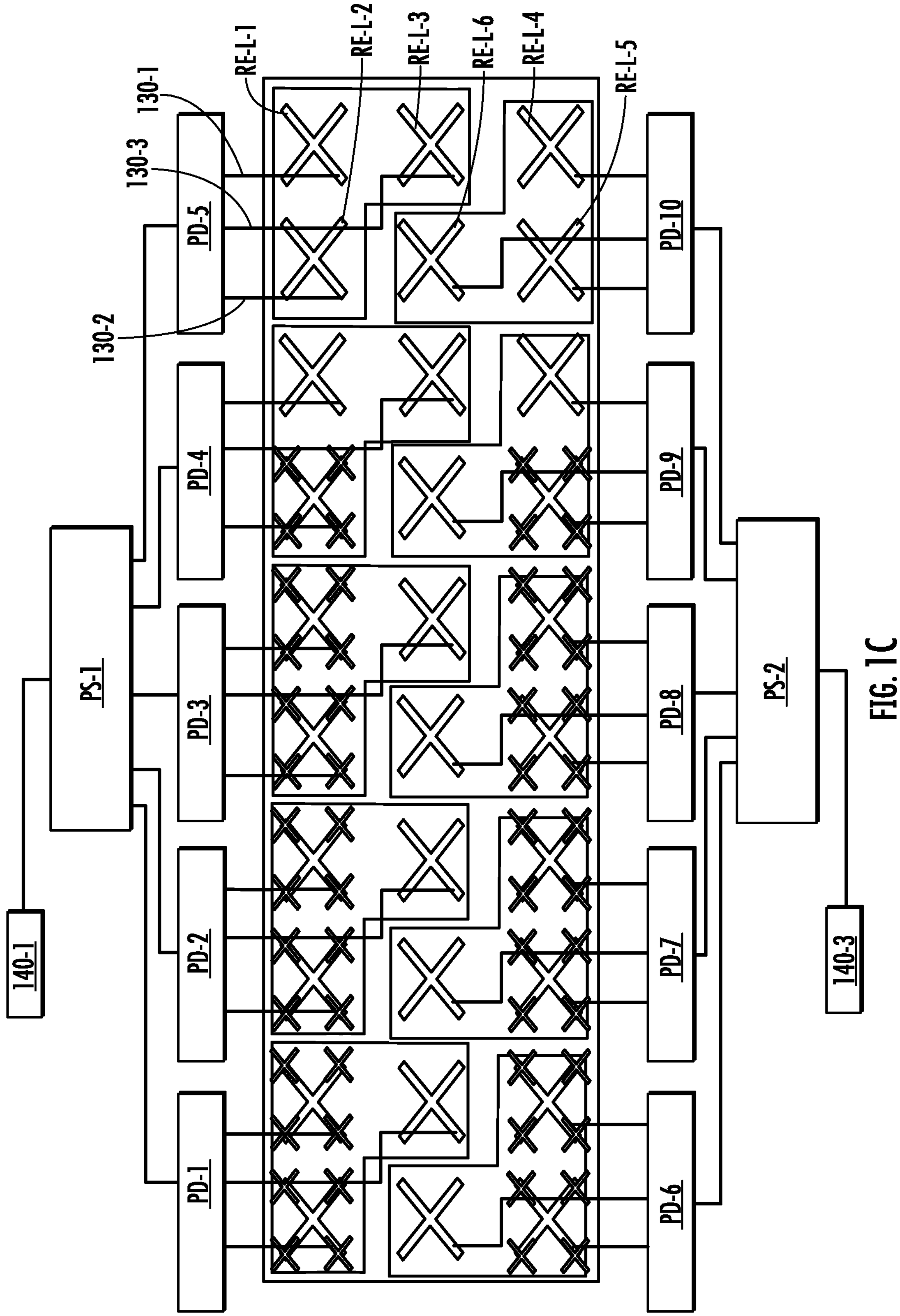
FIGS. 1C and 1D are schematic front views illustrating connections between the L-shaped sub-arrays of FIG. 1B and the antenna signal ports of FIG. 1A.
Figure 1D:
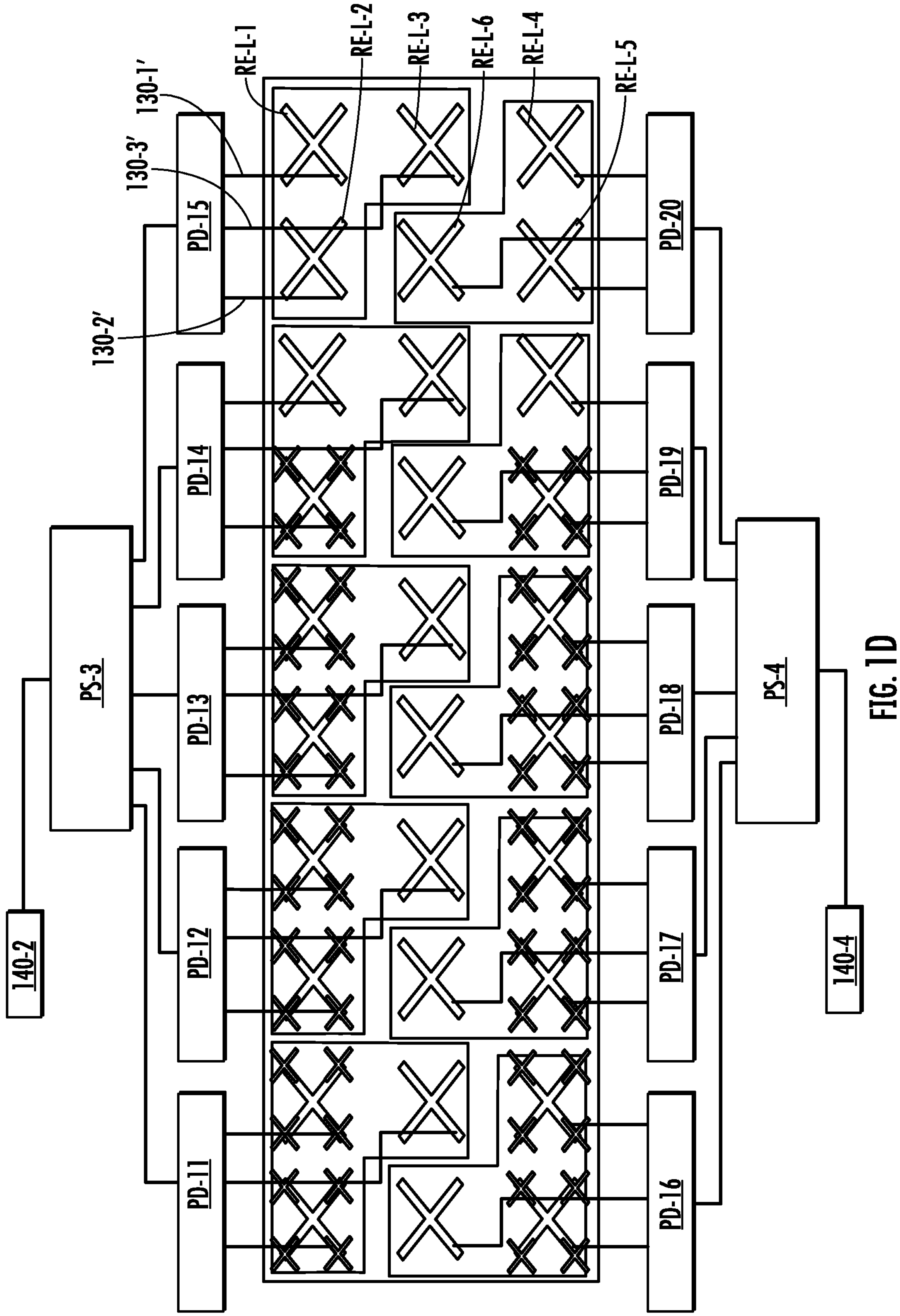

FIGS. 1C and 1D are schematic front views illustrating connections between the L-shaped sub-arrays SUB of FIG. 1B and the antenna signal ports 140 of FIG. 1A. FIG. 1C shows connections for a first polarization (e.g., +45°), and FIG. 1D shows connections for a second polarization (e.g., −45°). As shown in FIG. 1C, a plurality of power dividers PD are coupled to the sub-arrays SUB, respectively. For example, five power dividers PD-1 through PD-5 are coupled to the five first sub-arrays SUB-1-1 through SUB-1-5 (FIG. 1B) of the first array 112-1 (FIG. 1B), and five power dividers PD-6 through PD-10 are coupled to the five second sub-arrays SUB-2-1 through SUB-2-5 (FIG. 1B) of the second array 112-2 (FIG. 1B).

Each power divider PD may be a three-way (1:3) power divider. As an example, a fifth power divider PD-5 may be coupled to the three radiating elements RE-L-1 through RE-L-3 of the sub-array SUB-1-1 via respective RF transmission lines 130-1 through 130-3, respectively. According to some embodiments, the power dividers PD may each split power evenly such that all transmission lines 130 are configured to feed the same magnitude RF signal (e.g., sub-components thereof) to the radiating elements RE-L. The transmission lines 130 may comprise, for example, respective cables/wires, such as respective coaxial cables. The three low-band radiating elements RE-L of each sub-array SUB may be mounted on respective feed board printed circuit boards that are mounted on the front (i.e., forward) surface RLF of the reflector RL. The power dividers PD may be implemented on the feed board printed circuit boards in some embodiments.

In some embodiments, each array 112 may be coupled to a single phase shifter PS per polarization. For example, FIG. 1C shows that, for a first polarization, a first phase shifter PS-1 may be coupled between a first port 140-1 and five power dividers PD-1 through PD-5 that are coupled to the first array 112-1. A second phase shifter PS-2 may, likewise, be coupled between a third port 140-3 (for the first polarization) and five power dividers PD-6 through PD-10 that are coupled to the second array 112-2. Each phase shifter PS may thus be a 1:5 phase shifter, and each power divider PD may be coupled between a phase shifter PS and a sub-array SUB. Each phase shifter PS may split RF signals input thereto into a plurality of sub-components, and may apply a phase progression to the sub-components that applies a desired amount of electrical downtilt to the antenna beams generated by the respective low-band arrays 112-1, 112-2.

According to some embodiments, each low-band radiating element RE-L of a sub-array SUB may be configured to have a different respective fixed phase delay applied thereto (e.g., applied to a respective RF signal sub-component fed thereto). As an example, the three radiating elements RE-L-1 through RE-L-3 of the sub-array SUB-1-1 may be configured to have fixed phase delays of 0°, 33°, and 14°, respectively, applied thereto. Accordingly, the radiating element RE-L-3, which is in the inner column 170-2 (FIG. 1B), may be configured to have a phase delay applied thereto that is greater than that of the radiating element RE-L-1 and smaller than that of the radiating element RE-L-2.

Moreover, the three radiating elements RE-L-4 through RE-L-6 of the sub-array SUB-2-1 may be configured to have fixed phase delays of 0°, 33°, and 28°, respectively, applied thereto. Radiating elements RE-L that are in different outer columns 170-1, 170-3 (FIG. 1B) but the same row 120 (FIG. 1B) may thus be configured to have the same phase delay (e.g., 0° or 33°) applied thereto, whereas radiating elements RE-L-3, RE-L-6 that are adjacent each other in the inner column 170-2 may be configured to have respective phase delays applied thereto that are different (e.g., different by a factor of 2) from each other and different from phase delays of the outer columns 170-1, 170-3.

Adding a fixed phase difference between two radiating elements RE-L (e.g., the radiating elements RE-L-1, RE-L-2) of a sub-array SUB that are in an outer column 170-1 or 170-3 may reduce quantization lobes in the elevation plane. And a phase difference between two radiating elements RE-L (e.g., the radiating elements RE-L-1, RE-L-3) of a sub-array SUB that are in the same row 120 may improve squint performance in the azimuth plane (e.g., to meet performance criteria of 3 dB and 10 dB). Moreover, RF signal sub-components provided to the radiating elements RE-L may have the same amplitude, which may improve gain. For example, respective RF signal sub-components that are fed to the six radiating elements RE-L-1 through RE-L-6 may each have a gain of 0.33 dB.

In some embodiments, different phase delays of a sub-array SUB may be implemented by using transmission lines 130 having different lengths. For example, the transmission lines 130-1 through 130-3 that couple the radiating elements RE-L-1 through RE-L-3, respectively, to the power divider PD-5 may have three different respective cable/wire lengths. As an example, the third transmission line 130-3, which is coupled to the third radiating element RE-L-3 that is in the inner column 170-2, may have a length that is longer than respective lengths of the first and second transmission lines 130-1, 130-2. Other radiating elements RE-L that are in the inner column 170-2 may, likewise, be coupled to a respective power divider PD by a transmission line 130 that is longer than the other two transmission lines 130 that couple a sub-array SUB to the power divider PD. The other two transmission lines 130 may also have different respective lengths from each other. Moreover, the power dividers PD may, according to some embodiments, provide equal phase outputs to the transmission lines 130. Different phase delays in a sub-array SUB may thus be due to varying lengths of the transmission lines 130 rather than due to outputs of the power dividers PD.

As shown in FIG. 1D, analogous connections to those that are described herein for a first polarization with respect to FIG. 1C may be provided for a second polarization. FIG. 1D shows that second-polarization ports 140-2, 140-4 may be coupled to respective phase shifters PS-3, PS-4. Five power dividers PD-11 through PD-15 may be coupled between five sub-arrays SUB-1-1 through SUB-1-5 (FIG. 1B), respectively, and the phase shifter PS-3. Similarly, five power dividers PD-16 through PD-20 may be coupled between five sub-arrays SUB-2-1 through SUB-2-5 (FIG. 1B), respectively, and the phase shifter PS-4. For example, the fifteenth power divider PD-15 may be coupled to the three radiating elements RE-L-1 through RE-L-3 of the sub-array SUB-1-1 via three transmission lines 130-1' through 130-3', respectively. The transmission lines 130-1' through 130-3' may have different respective lengths.

Each radiating element RE-L may comprise, for example, a crossed-dipole radiating element that includes a first dipole radiator and a second dipole radiator that crosses/intersects the first dipole radiator. The dipole radiators each have two dipole "arms." To implement the radiating elements RE-L as dual-polarized crossed-dipole radiating elements, the first and second dipole radiators of each radiating element RE-L may be coupled to different transmission lines 130, respectively. For example, the first dipole radiator of the radiating element RE-L-1 may be coupled to the transmission line 130-1 (FIG. 1C) and the second dipole radiator of the radiating element RE-L-1 may be coupled to the transmission line 130-1'.

Moreover, though the two phase shifters PS-1 (FIG. 1C) and PS-3 are coupled to two different groups, respectively, of power dividers PD, the two phase shifters PS-1, PS-3 may, in some embodiments, be controlled by the same remote electrical tilt ("RET") rod. Similarly, the phase shifters PS-2 (FIG. 1C) and PS-4 may be controlled by the same RET rod.

Figure 1E:
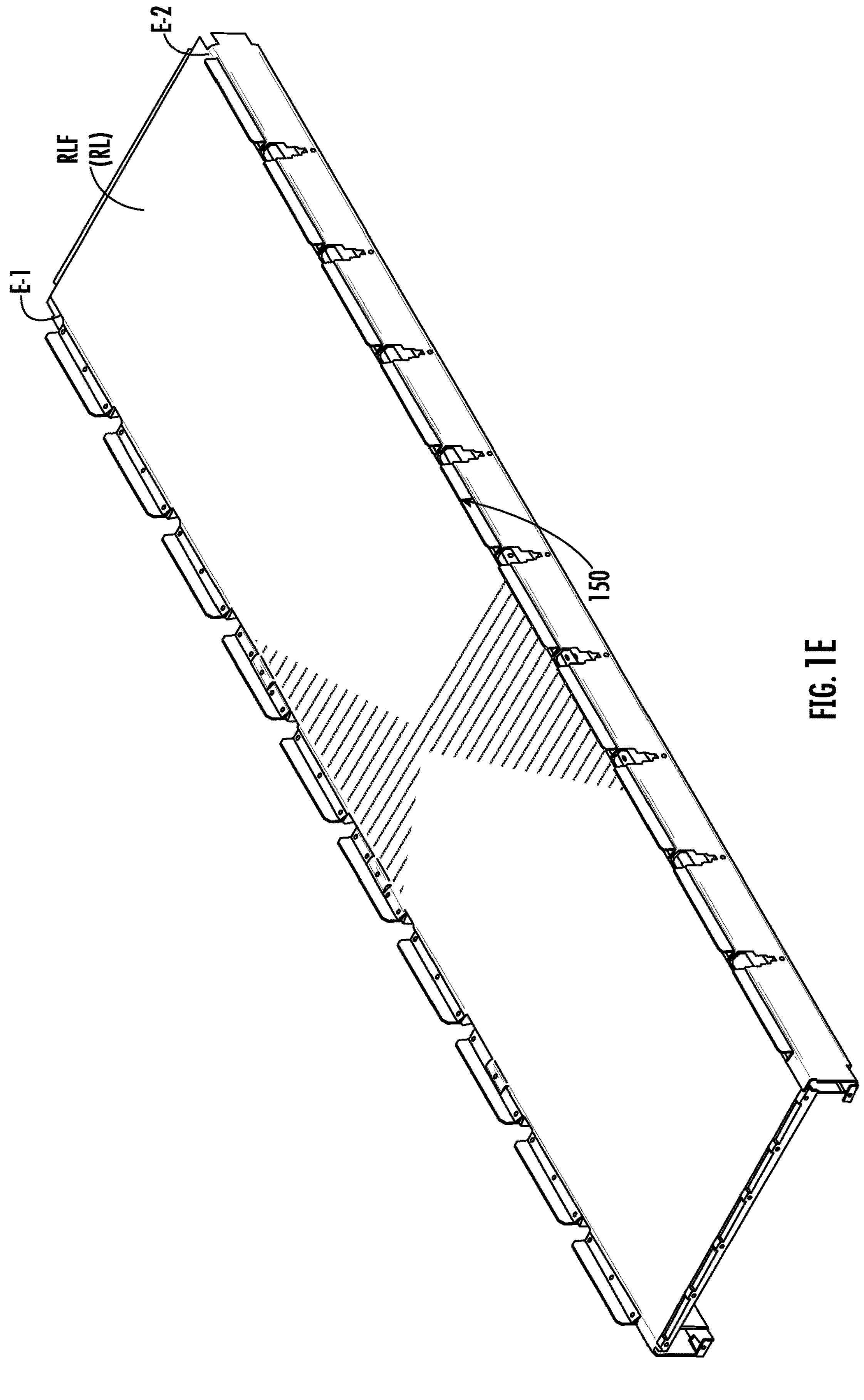
FIG. 1E is a front perspective view illustrating the metal side fences of FIG. 1A protruding from the reflector of FIG. 1A.

FIG. 1E is a front perspective view illustrating the metal side fences 150 of FIG. 1A protruding forward from the reflector RL of FIG. 1A. For simplicity of illustration, radiating elements RE (FIG. 1A) are omitted from view in FIG. 1E. As shown in FIG. 1E, a plurality of side fences 150 may protrude forward from first and second edges E-1, E-2 of the reflector RL. The edges E-1, E-2 are opposite edges that may extend parallel to each other in the direction V (FIG. 1A). In some embodiments, each side fence 150 protruding from the first edge E-1 may be parallel to a respective side fence 150 that protrudes from the second edge E-2. Moreover, each row 120 (FIG. 1A) of radiating elements RE may be between a pair of side fences 150, where each pair includes one side fence 150 on the first edge E-1 and another side fence 150 on the second edge E-2. For example, a first row 120-1 (FIG. 1B) may be between a first pair of side fences 150, and a second row 120-2 (FIG. 1B) may be between a second pair of side fences 150.

Figure 1F:
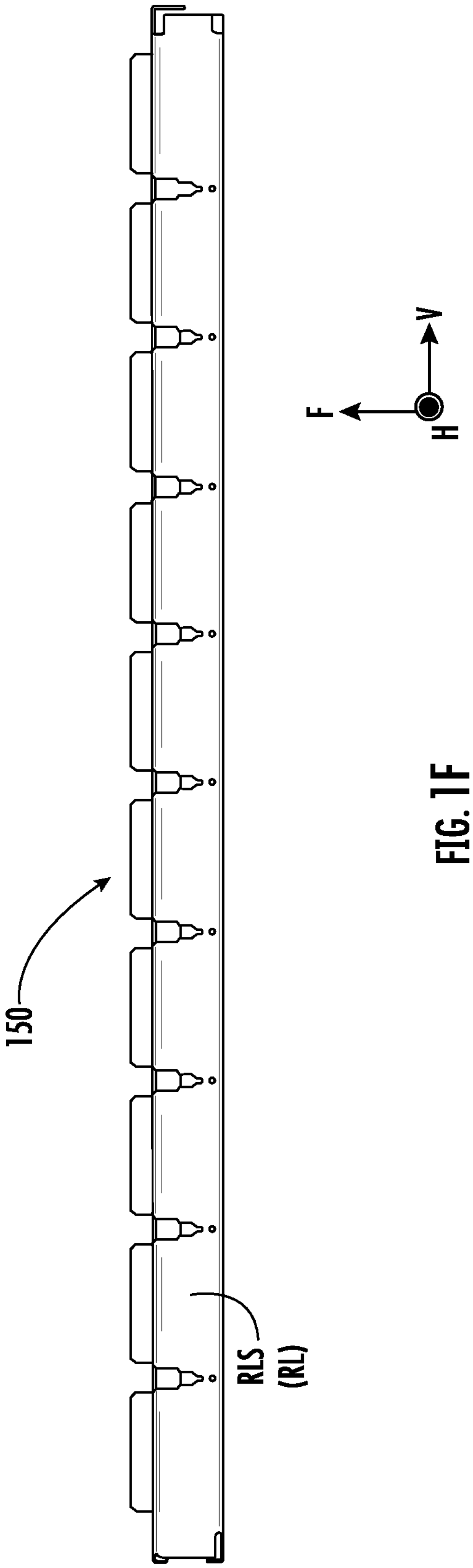
FIG. 1F is a side view of the metal side fences of FIG. 1E.

FIG. 1F is a side view of the metal side fences 150 of FIG. 1E. As shown in FIG. 1F, each side fence 150 protrudes from the reflector RL in the direction F. FIG. 1F also shows a side surface RLS of the reflector RL. In some embodiments, the side surface RLS may be perpendicular to the front surface RLF (FIG. 1E) of the reflector RL.

Figure 1G:
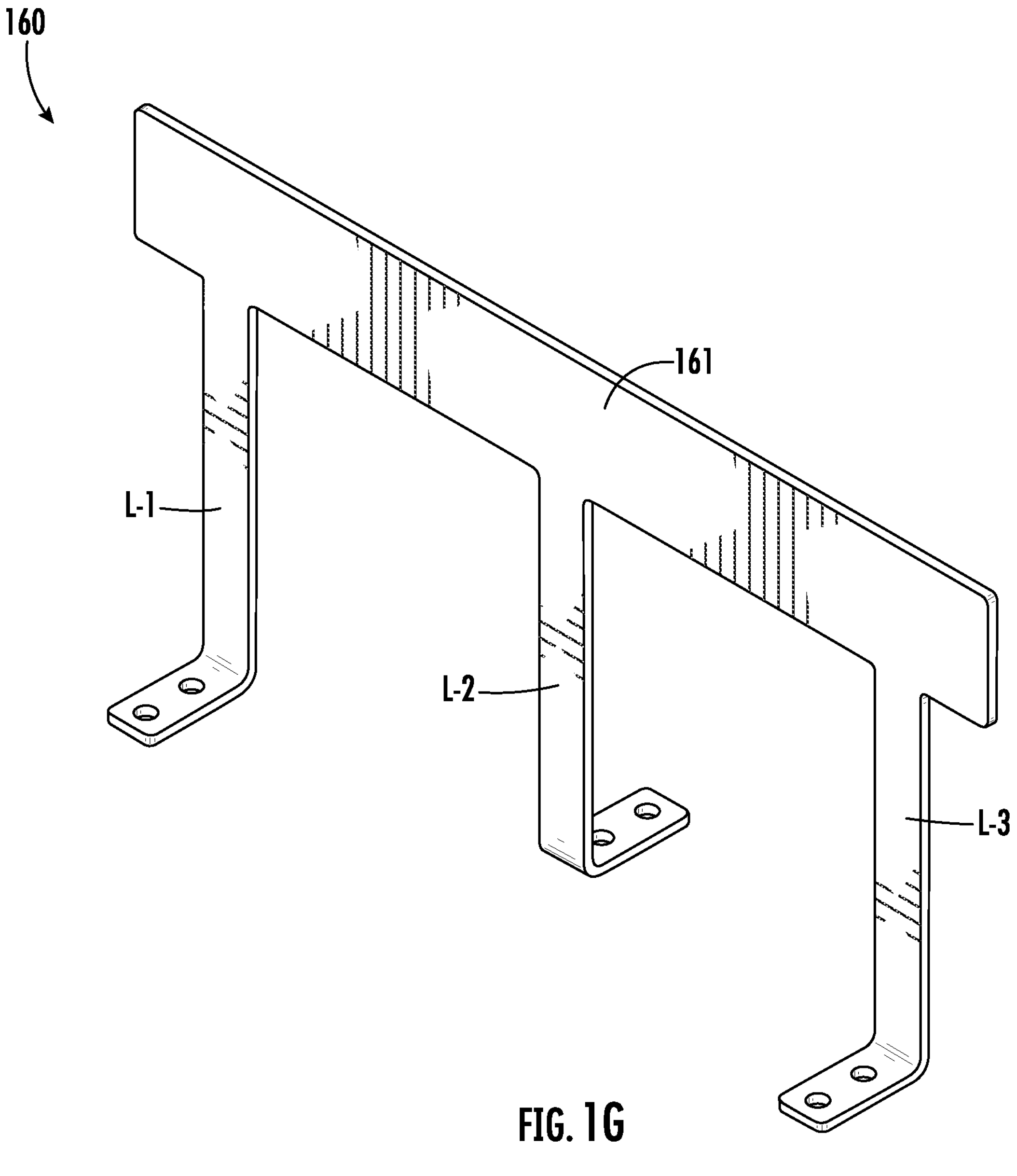
FIG. 1G is a side perspective view of a horizontal metal fence of FIG. 1B.

FIG. 1G is a side perspective view of a horizontal metal fence 160 of FIG. 1B. The horizontal fence 160 may include a main/body portion 161 and a plurality of leg portions L that support the main/body portion 161. For example, the horizontal fence 160 may include three leg portions L-1 through L-3. In some embodiments, the horizontal fence 160 may be about 150 mm long in the direction H (FIG. 1B), about 20 mm wide in the vertical direction V (FIG. 1B), and about 79 mm tall in the direction F. By placing horizontal fences 160 parallel to the azimuth plane in select locations on the front surface RLF (FIG. 1B) of the reflector RL (FIG. 1B), cross-band isolation may increase between the two arrays 112-1, 112-2 (FIG. 1B) of low-band radiating elements RE-L (FIG. 1B) without significantly distorting a radiation pattern of high-band radiating elements RE-H (FIG. 1B).

Figure 2:
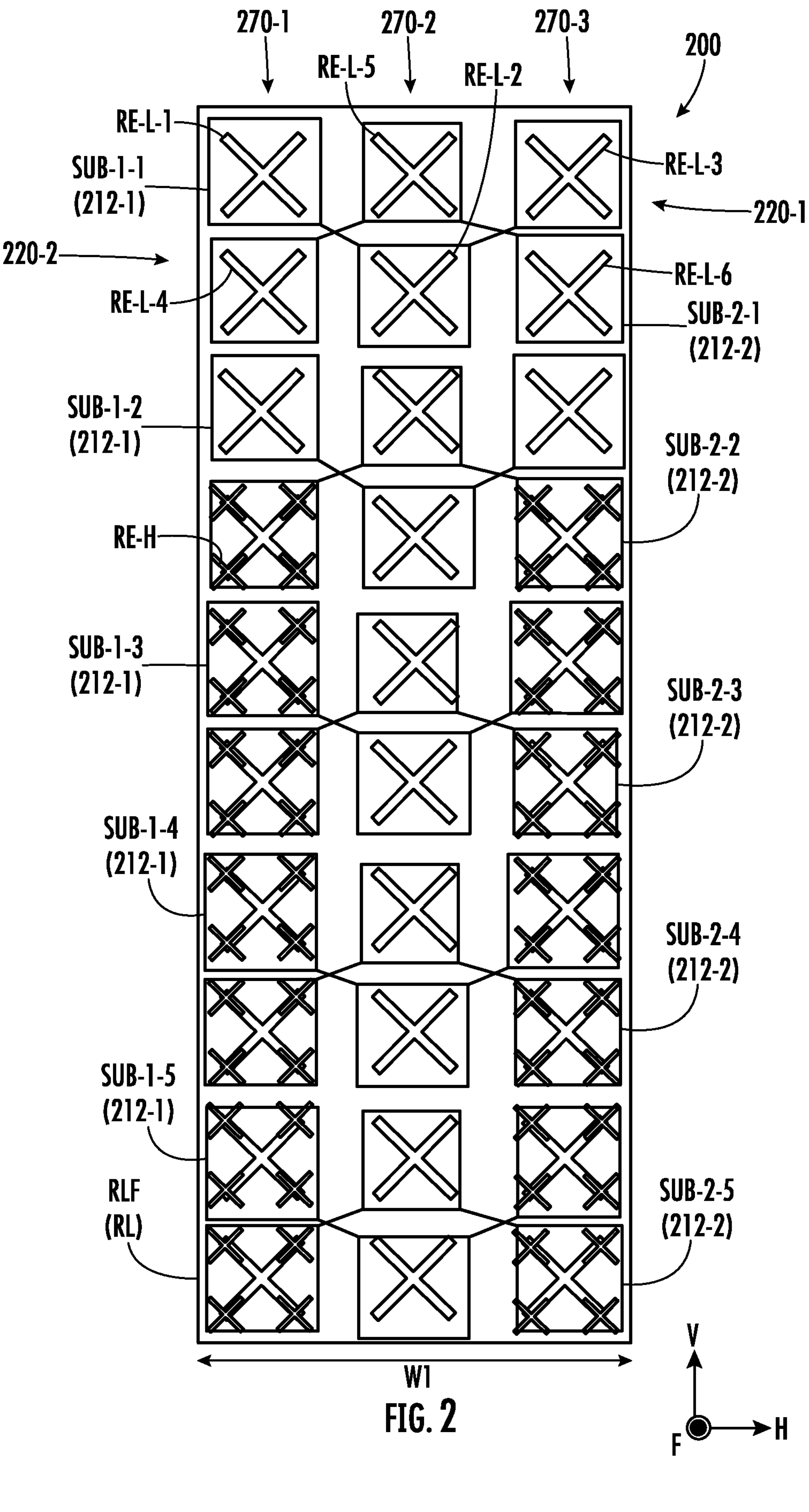
FIG. 2 is a schematic front view of a base station antenna that includes triangular-shaped sub-arrays of radiating elements according to embodiments of the present invention.

FIG. 2 is a schematic front view of a base station antenna 200 that includes multi-column 270, triangular-shaped sub-arrays SUB of radiating elements RE according to embodiments of the present invention. The radiating elements RE may be inside a radome of the antenna 200. For simplicity of illustration, the radome is omitted from view in FIG. 2.

As with the antenna 100 (FIG. 1A), the antenna 200 may have fewer columns 270 of radiating elements RE than a conventional four-column antenna. For example, the antenna 200 may have three vertical columns 270-1 through 270-3 of low-band radiating elements RE-L. Moreover, the antenna 200 may comprise two arrays 212-1, 212-2 of low-band radiating elements RE-L, where the first array 212-1 has five non-rectangular first sub-arrays SUB-1-1 through SUB-1-5 and the second array 212-2 has five non-rectangular second sub-arrays SUB-2-1 through SUB-2-5.

The arrays 212 differ from the arrays 112 (FIG. 1A) of the antenna 100, in that the first sub-arrays SUB-1 of the array 212-1 share a plurality of columns 270 (rather than a single shared column 170S (FIG. 1A)) of radiating elements RE-L with the second sub-arrays SUB-2 of the array 212-2. In each of the columns 270-1 through 270-3, radiating elements RE-L of the array 212-1 may repeatedly alternate, in the direction V, with radiating elements RE-L of the array 212-2. For example, each sub-array SUB may be a triangular sub-array having three radiating elements RE-L that are in the columns 270-1 through 270-3, respectively. As an example, a first sub-array SUB-1-1 of the first sub-arrays SUB-1 may include a first radiating element RE-L-1 in the first column 270-1, a second radiating element RE-L-2 in the second column 270-2, and a third radiating element RE-L-3 in the third column 270-3. The radiating elements RE-L-1, RE-L-3 may be in the same row 220-1. The radiating element RE-L-2, however, may be in a different row 220-2 from the radiating elements RE-L-1, RE-L-3, thereby providing a triangular shape for the sub-array SUB-1-1. Similarly, the radiating elements RE-L-4, RE-L-6 of the sub-array SUB-2-1 may be in the same row 220-2, and the radiating element RE-L-5 of the sub-array SUB-2-1 may be in the row 220-1.

For simplicity of illustration, antenna signal ports 140 (FIG. 1A) are omitted from view in FIG. 2. In some embodiments, however, the antenna 200 may include a plurality of ports 140, and each of the arrays 212-1, 212-2 may be coupled to a respective one of the ports 140 per polarization. For further simplicity of illustration, metal side fences 150 (FIG. 1A) and horizontal metal fences 160 (FIG. 1B) are omitted from view in FIG. 2. According to some embodiments, however, the antenna 200 may include side fences 150 and/or horizontal fences 160 at locations corresponding to (or similar to) those described herein with respect to the antenna 100.

In some embodiments, a reflector RL of the antenna 200 may have the same width W1 (e.g., about 640 mm) as that of the antenna 100. The radiating elements RE-L of the arrays 212-1, 212-2 may protrude forward from a front surface RLF of the reflector RL. Moreover, the antenna 200, like the antenna 100, may include high-band radiating elements RE-H that are overlapped, in the direction F, by some of the radiating elements RE-L. For example, each outer column 270-1, 270-3 may include seven radiating elements RE-L that each overlap four radiating elements RE-H. Rows 220 of radiating elements RE-L that are closest, in the direction V, to the top of the antenna 200 may, in some embodiments, not overlap any radiating elements RE-H. As an example, the rows 220-1, 220-2 may not overlap any radiating elements RE-H.

Antennas 100, 200 (FIGS. 1A and 2) according to embodiments of the present invention may provide a number of advantages. A conventional, non-interleaved four-column antenna (e.g., with ten low-band radiating elements per column) may need a width of at least 900 mm to meet azimuth performance requirements. Moreover, the conventional antenna may have a high cost due to its large number of (e.g., forty) low-band radiating elements, and may have a heavy weight due to the width and large number of radiating elements. By contrast, the antennas 100, 200 may have a compact design (e.g., a width W1 (FIGS. 1B and 2) that is narrower than 700 mm) comprising two interleaved arrays 112-1, 112-2 (FIG. 1B), or two interleaved arrays 212-1, 212-2 (FIG. 2). The antennas 100, 200 may also have fewer radiating elements (e.g., thirty low-band radiating elements RE-L (FIGS. 1B and 2)) and a lighter weight (due to the narrower width and fewer radiating elements) than the conventional antenna.

In some embodiments, the antenna 100 may improve squint performance and/or reduce quantization lobes by distributing different amounts of fixed phase delay to different radiating elements RE-L that are in an L-shaped sub-array SUB (FIG. 1B). The different phase delays may be implemented by, for example, varying lengths of transmission lines 130 (FIG. 1C) that are coupled to the sub-array SUB. Isolation between the arrays 112-1, 112-2 may be increased by the different phase delays and/or by horizontal metal fences 160 (FIG. 1B) that are between the arrays 112-1, 112-2. Moreover, metal side fences 150 (FIG. 1E) may improve front-to-back isolation and cross-polarization isolation (within each array 112-1, 112-2) of the antenna 100.

In other embodiments, the antenna 200 may achieve a narrower beamwidth by providing a plurality of sub-arrays SUB-1, SUB-2 (FIG. 2) that each have low-band radiating elements RE-L in all three columns 270-1 through 270-3 (FIG. 2) of the antenna 200. As an example, each of the sub-arrays SUB-1, SUB-2 may have a triangular shape.

Embodiments of the present invention have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

That which is claimed is:

1. A base station antenna comprising:

a first antenna array having a vertical stack of first sub-arrays that each comprise a plurality of first-band radiating elements; and a second antenna array having a vertical stack of second sub-arrays that each comprise a plurality of first-band radiating elements, wherein the first sub-arrays share a vertical column of first-band radiating elements with the second sub-arrays, and wherein the first-band radiating elements that are in the shared vertical column are configured to have a fixed phase delay applied thereto that is different from fixed phase delays of the first-band radiating elements of portions of the first and second sub-arrays that are outside of the shared vertical column.

2. The base station antenna of claim 1, wherein the first and second sub-arrays are each L-shaped sub-arrays.

3. The base station antenna of claim 1, further comprising a reflector having the first and second antenna arrays thereon, wherein a width of the reflector is narrower than 700 millimeters, and wherein the first-band radiating elements are configured to operate in all or part of a 617-960 megahertz frequency band.

4. The base station antenna of claim 1, further comprising:

a plurality of first power dividers that are coupled to the first sub-arrays, respectively; and a plurality of second power dividers that are coupled to the second sub-arrays, respectively.

5. The base station antenna of claim 4, wherein each of the first and second power dividers comprises a three-way power divider.

6. The base station antenna of claim 4, further comprising a plurality of phase shifters, wherein a first of the first power dividers is coupled between a first of the phase shifters and a first of the first sub-arrays, and wherein a first of the second power dividers is coupled between a second of the phase shifters and a first of the second sub-arrays.

7. The base station antenna of claim 1, wherein the first and second sub-arrays each comprise three first-band radiating elements that are configured to have three different fixed phase delays, respectively, applied thereto.

8. The base station antenna of claim 7, wherein a single one of the three first-band radiating elements is in the shared vertical column.

9. The base station antenna of claim 1, further comprising a plurality of second-band radiating elements, wherein some, but not all, of the first sub-arrays overlap the second-band radiating elements in a forward direction, wherein some, but not all, of the second sub-arrays overlap the second-band radiating elements in the forward direction, and wherein the second band is higher than the first band.

10. The base station antenna of claim 9, wherein the shared vertical column does not overlap any of the second-band radiating elements in the forward direction.

11. A base station antenna comprising:

a first outer column of radiating elements of a first array, the first array comprising a plurality of first non-rectangular sub-arrays;

a second outer column of radiating elements of a second array, the second array comprising a plurality of second non-rectangular sub-arrays;

an inner column of radiating elements that is shared by the first and second arrays and is between the first and second outer columns; and a plurality of power dividers, the power dividers comprising first power dividers that are coupled to the first non-rectangular sub-arrays, respectively, and second power dividers that are coupled to the second non-rectangular sub-arrays, respectively, wherein a first of the first non-rectangular sub-arrays comprises first through third radiating elements, wherein the first and second radiating elements are in the first outer column and are coupled by first and second radio frequency (RF) transmission lines, respectively, to a first of the first power dividers, wherein the first and second RF transmission lines have different first and second lengths, respectively, and wherein the third radiating element is in the inner column and is coupled to the first of the first power dividers by a third RF transmission line having a third length that is longer than each of the first and second lengths.

12. The base station antenna of claim 11, wherein a first of the second non-rectangular sub-arrays comprises fourth through six radiating elements, wherein the fourth and fifth radiating elements are in the second outer column and are coupled by fourth and fifth RF transmission lines, respectively, to a first of the second power dividers, wherein the fourth and fifth RF transmission lines have different fourth and fifth lengths, respectively, and wherein the sixth radiating element is in the inner column and is coupled to the first of the second power dividers by a sixth RF transmission line having a sixth length that is longer than each of the fourth and fifth lengths.

13. The base station antenna of claim 12, wherein the first, third, and fourth radiating elements are in a first row, and wherein the second, sixth, and fifth radiating elements are in a second row.

14. The base station antenna of claim 13, further comprising:

a reflector having the first and second arrays thereon;

a plurality of first metal isolation walls protruding forward from a first edge of the reflector; and a plurality of second metal isolation walls protruding forward from a second edge of the reflector that is opposite the first edge, wherein the first row is between a first of the first metal isolation walls and a first of the second metal isolation walls, and wherein the second row is between a second of the first metal isolation walls and a second of the second metal isolation walls.

15. The base station antenna of claim 13, further comprising a metal isolation wall that is between the third radiating element and the sixth radiating element.

16. The base station antenna of claim 13, wherein the first through sixth RF transmission lines comprise first through sixth cables, respectively, wherein the base station antenna further comprises a plurality of RF ports and a plurality of phase shifters that are coupled to the RF ports, respectively, wherein a first of the phase shifters is coupled between a first of the RF ports and the first of the first power dividers, and wherein a second of the phase shifters is coupled between a second of the RF ports and the first of the second power dividers.

17. A base station antenna comprising:

a first antenna array having a vertical stack of first sub-arrays that each comprise a plurality of first-band radiating elements; and a second antenna array having a vertical stack of second sub-arrays that each comprise a plurality of first-band radiating elements, wherein the first sub-arrays share a plurality of vertical columns of first-band radiating elements with the second sub-arrays, and wherein the first and second sub-arrays are each triangle-shaped sub-arrays.

18. The base station antenna of claim 17, wherein the first and second sub-arrays each comprise three first-band radiating elements, and wherein the three first-band radiating elements are in three of the vertical columns, respectively.

19. The base station antenna of claim 18, wherein, in each of the three of the vertical columns, the first-band radiating elements of the first antenna array repeatedly alternate with the first-band radiating elements of the second antenna array, wherein the base station antenna further comprises a plurality of radio frequency ports, and wherein each of the first and second antenna arrays is coupled to a respective one of the radio frequency ports per polarization.

* * * * *